(12) United States Patent
Liu et al.

(10) Patent No.: US 12,081,925 B2
(45) Date of Patent: Sep. 3, 2024

(54) OPTICAL LINE TERMINAL LINE CARD AND METHOD COMPATIBLE WITH PON FUNCTION

(71) Applicant: ZTE CORPORATION, Guangdong (CN)

(72) Inventors: Shengjie Liu, Guangdong (CN); Feng Xue, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 38 days.

(21) Appl. No.: 17/776,596

(22) PCT Filed: Oct. 14, 2020

(86) PCT No.: PCT/CN2020/120936
§ 371 (c)(1),
(2) Date: May 13, 2022

(87) PCT Pub. No.: WO2021/093505
PCT Pub. Date: May 20, 2021

(65) Prior Publication Data
US 2022/0394363 A1    Dec. 8, 2022

(30) Foreign Application Priority Data

Nov. 13, 2019 (CN) .......................... 201911108758.6

(51) Int. Cl.
*H04Q 11/00* (2006.01)
*H04B 10/25* (2013.01)
(Continued)

(52) U.S. Cl.
CPC ......... *H04Q 11/0067* (2013.01); *H04B 10/25* (2013.01); *H04B 10/27* (2013.01); *H04L 25/02* (2013.01); *H04Q 11/0062* (2013.01)

(58) Field of Classification Search
CPC .... H04B 10/25; H04B 10/27; H04Q 11/0062; H04Q 11/0067; H04L 25/02
(Continued)

(56) References Cited

U.S. PATENT DOCUMENTS

2006/0133809 A1* 6/2006 Chow ................... H04J 3/1694
                                                        398/66
2021/0328674 A1* 10/2021 Zhang ..................... H04L 69/18

FOREIGN PATENT DOCUMENTS

CN        105049265 A      11/2015
CN        105263071 A       1/2016
(Continued)

OTHER PUBLICATIONS

Chris Sterzik: "Interfacing Different Logic With LVDS Receivers", Texas Instruments, Application Report, SLLA 101, Sep. 2001, pp. 1-17 (Year: 2001).*

(Continued)

*Primary Examiner* — Li Liu
(74) *Attorney, Agent, or Firm* — Dority & Manning, P.A.

(57) ABSTRACT

Embodiments of the present application provide an optical line terminal line card and a method compatible with a PON function. The optical line terminal line card includes an optical module, a MAC module, a toggle switch, a switch controller, a series resistor and a pull-down resistor. The optical module is connected to the MAC module to form a first connection line, the series resistor is provided on a side of the first connection line close to the optical module and on the first connection line, the pull-down resistor is connected to the first connection line by means of a second connection line, the toggle switch is provided on the second connection line and is located between the first connection
(Continued)

line and the pull-down resistor, and the switch controller is connected to the optical module and the toggle switch, respectively.

12 Claims, 2 Drawing Sheets

(51) Int. Cl.
*H04B 10/27* (2013.01)
*H04L 25/02* (2006.01)

(58) Field of Classification Search
USPC .............................................. 398/58, 66, 158
See application file for complete search history.

(56) References Cited

FOREIGN PATENT DOCUMENTS

| CN | 205051830 U | | 2/2016 | |
| CN | 108540231 B | * | 10/2019 | ............. H04B 10/40 |
| WO | 2014194760 A1 | | 12/2014 | |

OTHER PUBLICATIONS

Jeff Ju: "Interfacing LVDS with other differential-I/O types", EDN, Oct. 30, 2003, pp. 81-86 (Year: 2003).*
ZTE Corporation, International Search Report with English translation, PCT/CN2020/120936, Jan. 14, 2021, 6 pgs.

* cited by examiner

OPTICAL LINE TERMINAL LINE CARD AND METHOD COMPATIBLE WITH PON FUNCTION

CROSS REFERENCE TO RELATED APPLICATIONS

The present application is a United States National Stage Application filed under 35 U.S.C. § 371 of PCT Patent Application Serial No. PCT/CN2020/120936, filed on Oct. 14, 2020, which claims priority to Chinese Patent Application No. 201911108758.6, filed on Nov. 13, 2019, each of which is incorporated by reference herein in its entirety.

TECHNICAL FIELD

The embodiments described in the present disclosure relate but not limited to the technical field of optical access communication, and specifically relate but not limited to a line card for an optical line terminal and a method for providing compatible passive optical network (PON) function.

BACKGROUND

In the access technology for the fixed broadband network, the passive optical network (PON) has become a main solution of fiber to the x (FTTx) for major operators worldwide. Currently, PON technologies deployed in a large scale mainly includes the gigabit-capable passive optical network (GPON) technology and the Ethernet passive optical network (EPON) technology deployed in China, Japan and South Korea. A downlink rate of the GPON technology is 2.5 Gb/s, while an uplink rate of the GPON technology is 1.25 Gb/s. A uplink/downlink symmetric rate of the EPON technology is 1.25 Gb/s. With launching of the policies such as "broadband China" and "bringing up network rate while reducing costs", network capability of the fixed broadband in China has been improved significantly in recent years. In addition, with fast development of the 4K/8K video, virtual reality (VR)/augmented reality (AR), intelligent home services and the like, operators require more increase in broadband and management on full-service operation. PON technologies with higher rates are accordingly improving. For example, the PON technology with a rate of 10 Gb/s is gradually commercialized. Selection of the 10 G PON technology has become a focus for the operators in network upgrade and new service development.

Although a network element of an optical line terminal (OLT) in related art has a plurality of single boards and therefore a plurality of PON ports, a configuration mode supported by the PON ports on respective signal board is unitary. Current networks involve complicated conditions and clients of varied types have varied application needs. When optical network unit (ONU) terminals of varied types are accessing, the ONU terminals can by no means access due to lack of PON interfaces supporting the types of the ONU terminals, and hardware has to be replaced. However, the handover process by replacing a hardware single board would cause interruption to user application and a fault tends to occur during an upgrading process, which impacts the user experience.

SUMMARY

In some embodiments of the present application, an optical line terminal and a method for providing compatible PON function are provided.

In some embodiments, a line card for an optical line terminal is provided. The line card for the optical line terminal includes an optical module, a media access control (MAC) module, a toggle switch, a switch controller, a series resistor and a pull-down resistor. The optical module is connected to the MAC module to form a first connection line, and the series resistor is provided on a side of the first connection line close to the optical module and on the first connection line. The pull-down resistor is connected to the first connection line by means of a second connection line, and the toggle switch is provided on the second connection line and is located between the first connection line and the pull-down resistor. The switch controller is connected to the optical module and the toggle switch, respectively.

In some embodiments, a method for providing compatible PON function is provided. The method includes: detecting, by a switch controller, a current operation mode of a port of an optical module; controlling, by the switch controller, a toggle switch to close or open according to the current operation mode; in response to the toggle switch closing, an output signal of the optical module is attenuated by a series resistor, biased by a pull-down resistor and transmitted to a media access control (MAC) module; and in response to the toggle switch opening, the output signal of the optical module is attenuated by the series resistor and transmitted to the MAC module.

Other features of the present disclosure and corresponding beneficial technical effects are described in the following parts of the description. It shall be appreciated that at least some beneficial technical effects become evident based on the description of the present disclosure.

DETAILED DESCRIPTION OF THE EMBODIMENTS

Figure 1:
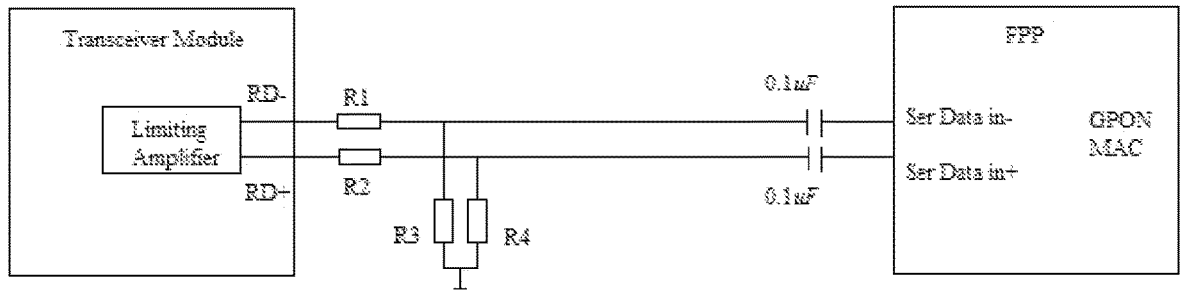
FIG. 1 is a schematic diagram of a hardware matching circuit for a GPON mode in related technologies.

In order to clarify the purpose, the technical solution and the advantages of the present disclosure, the embodiments of the present disclosure are further illustrated with reference to detailed description combined with the drawings. It shall be noted that the embodiments are intended to explain rather than to limit the present disclosure.

Embodiment 1

In order to address a problem in the related art that PON ports on a same OLT line card only support an unitary configuration mode for access of an ONU terminal, thereby practical application requirements cannot be met, this embodiment provides a line card for an optical line terminal, which not only supports a high-rate XGSPON technology, but is also compatible with conventional low-rate GPON and XGPON technologies.

The line card for the optical line terminal is applied to a PON system. The PON system is composed of an OLT, an optical distribution network (ODN) and an ONU. Therefore, in an application using the PON technology, the OLT is important office equipment. The OLT mainly has functions as follows: the OLT is connected with a front-end switch through a network cable and interconnected with an optical splitter on a user side through a single optical fiber, and the OLT converts electrical signals into optical signal, to implement control, management, distance measurement or the like on ONU equipment on the user side. It shall be appreciated that the OLT is a photoelectric integrated device, i.e., the OLT is able to implement photoelectric conversion. This function is mainly achieved by an optical module of the OLT.

The OLT includes a plurality of single boards. Each of the single boards is provided with PON ports for connecting with an optical fiber. However, a port of an optical fiber generally cannot be directly connected to a PON port, thus an optical module is needed to be inserted into the PON ports and then the optical fiber can be connected. In this case, an optical module with a corresponding type of ports may be selected according to the type of port of the optical fiber.

In the PON technology, a PON mode includes but not limited to a GPON mode, a 10 G PON mode and an XGSPON mode (symmetric 10 G GPON). Each mode corresponds to a type of optical module. Because each single board of the OLT only supports an unitary configuration mode, the single board can be accessed only by a single ONU terminal.

In the following, a GPON optical module and a 10 G PON module are taken as examples to describe the circuits matched with them in term of hardware.

See Table 1 and Table 2, where Table 1 shows electrical level types of the GPON optical module, and Table 2 shows indices of the GPON optical module.

TABLE 1

| TD+ | LVPECL | Tx Data+ | TX data input, internally DC coupled with 100 ohm terminated |
|---|---|---|---|
| TD− | LVPECL | Tx Data− | Inv. TX data input, internally DC coupled with 100 ohm terminated |
| RD− | LVPECL | Rx Data− | Inv. RX data output, DC coupled output |
| RD+ | LVPECL | Rx Data+ | RX data output, DC coupled output |

TABLE 2

| Parameter | Symbol | Min | Max | Unit | Notes |
|---|---|---|---|---|---|
| TX_data Differential Input Voltage | $V_{IH}$-$V_{IL}$ | 200 | 1600 | mV | LVPECL, AC coupled |
| RX_data Differential Input Voltage | $V_{IH}$-$V_{IL}$ | 400 | 1600 | mV | |

The GPON optical module outputs a RD signal with a rate of 1.25 Gb/s. An electrical level of the RD signal is low voltage positive emitter-couple logic (LVPECL) and the electrical level of the LVPECL is 1600 mV. Because the GPON optical module outputs the LVPECL level, and on a receiving side of a media access control (MAC) module is a current mode logic (CML) level, a single board of an OLT needs to apply a matching circuit as shown in FIG. 1. Herein, 0.1 μF capacitance is an alternating current (AC) coupling capacitance. Series resistors R1 and R2 are used for attenuating output to meet an input voltage requirement tolerable for a CIVIL receiver. Pull-down resistors R3 and R4 are used for providing a bias current for the LVPECL level. In FIG. 1, "limiting amplifier" is a limiting amplifier within the optical module and "transceiver module" is a transceiver module, which can be deemed as the optical module. "Ser Data" is a high-rate Serdes interface within a PON processor (FPP), and is an internal interface of the chip.

See Table 3 and Table 4, where Table 3 shows electrical level types of a 10 G PON optical module, and Table 4 shows indices of the 10 G PON optical module.

TABLE 3

| TD+ | Non-Inverted Transmit Data in | CML input, AC coupled |
|---|---|---|
| TD− | Inverted Transmit Data in | CML input, AC coupled |
| RD− | Inverted Received Data out | CML output, AC coupled |
| RD+ | Non-Inverted Received Data out | CML output, AC coupled |

TABLE 4

| Parameter | Min | Max | Unit | Notes |
|---|---|---|---|---|
| Data Input Differential Swing | 120 | 820 | mV | CML input, AC coupled |
| Data Output Differential Swing | 340 | 850 | mV | CML output, AC coupled |

Figure 2:
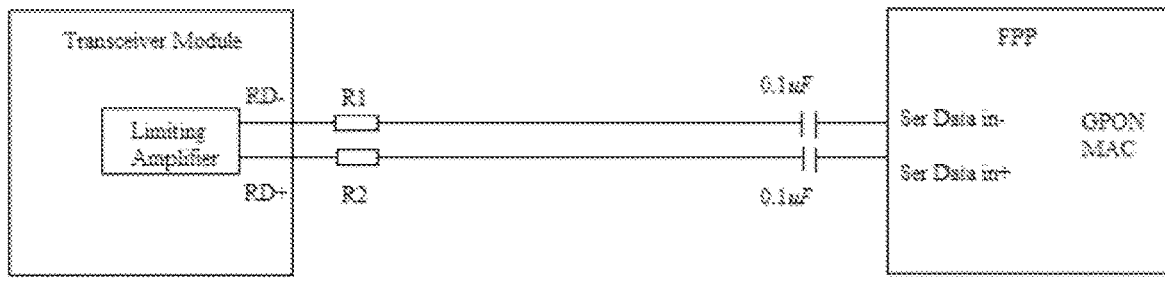
FIG. 2 is a schematic diagram of a hardware matching circuit for a 10 G PON mode in the related technologies.

In response to the 10 G PON optical module being inserted to a single board, the 10 G PON optical module outputs an RD signal with a rate of 10 Gb/s. An electrical level of the RD signal is a CML, and on a receiving side of a MAC module is also a CML level. Therefore, a single board of an OLT needs to apply a matching circuit as shown in FIG. 2. Herein, 0.1 μF capacitance is an AC coupling capacitance. The series resistors R1 and R2 are used for attenuating output to meet an input voltage requirement tolerable for the CML receiver. Herein, there is no pull-down resistor.

In view of the above, there are differences between the matching circuits for optical modules of different types, and the differences mainly lie in whether there is a pull-down resistor or not.

Figure 3:
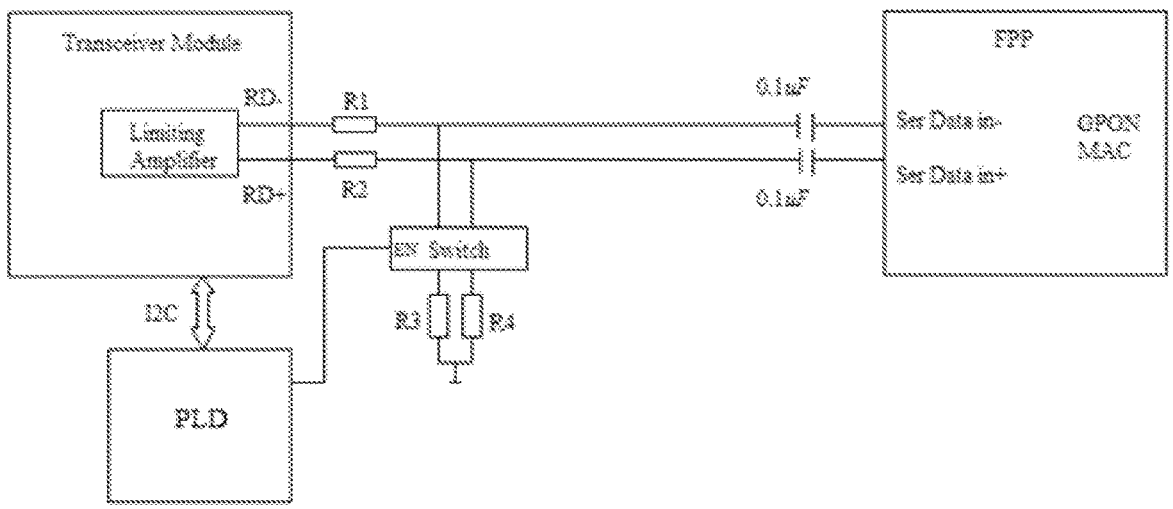
FIG. 3 is a schematic diagram of a hardware matching circuit for providing compatible PON function in accordance with Embodiment 1 of the present disclosure.

In order to achieve compatible use of PON functions on line cards of an OLT, this embodiment provides a line card for an optical line terminal. The line card for the optical line terminal includes an optical module, a MAC module, a toggle switch, a switch controller, a series resistor and a pull-down resistor. With reference to FIG. 3, this embodiment is described in detail based on the example of achieving compatible use of GPON and 10 G PON on a single line card of the OLT.

In this embodiment, the optical module is connected to the MAC module to form a first connection line, and the series resistor is provided on a side of the first connection line close to the optical module and on the first connection line. The pull-down resistor is connected to the first connection line by means of a second connection line, and the toggle switch is provided on the second connection line and is located between the first connection line and the pull-down resistor. The switch controller is connected to the optical module and the toggle switch, respectively.

In this embodiment, the line card for the optical line terminal further includes a coupling capacitor provided on the first connection line and on a side of the first connection line close to the MAC module. It shall be appreciated that a function of the coupling capacitor is to transmit an AC signal from one stage to a next stage, and to cut off a direct current signal when transmitting the AC signal, so as to isolate operation points at adjacent stages. In this embodiment, the coupling capacitor is a 0.1 g capacitor.

In order to enable the line card for the optical line terminal to support PON functions of varied types at the same time, the MAC module may be a Fabric PON Processor (FPP) chip.

In this embodiment, the optical module includes an optical port which is a compatible port. In some application scenarios, the compatible port may be a small form-factor pluggables (SFP)+ port. Thus, both the GPON optical module and the 10 G PON optical module can operate by inserting in the optical port. In this way, compatibility of two types of optical modules are achieved by a matching circuit for the single board circuit.

It shall be appreciated that an optical module is a high-performance optical module for a PON system. A main function of the optical module is to achieve photoelectrical conversion. In practice, the optical module cooperates with an ONU device. When the optical module is connected with the ONU device for communication, the ONU device may acquire information stored in an electrically erasable programmable read only memory (EEPROM) of the optical module by accessing the EEPROM of the optical module through an inter-integrated circuit (I2C) bus. In practice, each optical module is provided with an EEPROM. An EEPROM stores transmission parameter information such as a central wave length, a transmission rate, a transmission distance or the like, of the optical module.

In this embodiment, the optical module is connected to the MAC module to form a first connection line. The first connection line includes a first physical line and a second physical line. The first physical line and the second physical line are differential lines. The differential lines refer to two lines which are parallel to each other, have a same length and are used for transmitting signals with a phase difference of 180°. That is, the first physical line and the second physical line have a same length and are parallel to each other. One line is used to transmit a positive signal, and the other is used to transmit a negative signal. The differential lines have a function of anti-interference.

In this embodiment, the optical module and the MAC module are connected by the differential lines. Series resistors are provided on two physical lines of the differential lines, respectively. The series resistors are provided on a side of the two physical lines close to the optical module to attenuate signals, so as to meet requirement for the reception of the MAC module. Specifically, the series resistors are R1 and R2. Correspondingly, coupling capacitors are provided on a side of the two physical lines close to the MAC module and on the two physical lines of the differential lines, respectively.

In this embodiment, the second connection line is connected to the first connection line between the series resistor and the coupling capacitor. The pull-down resistor is connected to the second connection line. A toggle switch is provided on the second connection line between the pull-down resistor and the first connection line. Specifically, the first connection line is provided with differential lines, and two lines each connected with a line of the differential lines, respectively, are provided. Each of the two lines is connected with a pull-down resistor. Pull-down resistors are R3 and R4. The toggle switch is provided between the differential lines and the pull-down resistors, so as to support differential input. In this embodiment, the pull-down resistor is a direct current (DC) bias resistor.

In this embodiment, the switch controller is connected to the optical module. Specifically, the switch controller may be connected to the optical module through the I2C bus. Physically, only two lines, a data line and a clock line are required for the I2C bus. A bus interface is already integrated in the chip and no special interface circuit is needed. Therefore, the I2C bus simplifies wiring of a physical circuit, reduces cost for a system and improves reliability of the system. Besides, current consumption of the bus is extremely low, and the bus is resistant to high noise interference and is compatible with devices of different voltage classes. Furthermore, the bus has a wide range of operation temperatures.

It shall be noted that the switch controller can read a serial identifier (ID) of the optical module through the I2C bus, and thereby determine a type of a current optical module. The switch controller controls the toggle switch to close or open according to a type of the optical module.

In this embodiment, the switch controller is a programmable logic device (PLD). The toggle switch is an analog switch. The analog switch performs control based on voltages, and has advantages of high switch speed, low power consumption, and supporting differential input.

In this embodiment, operation modes of a port of an optical module include a GPON mode and a 10 G PON mode. In response to the switch controller determining that the operation mode is the GPON mode, an output end of the optical module functions as a LVPECL drive, and the MAC module functions as a CML receiver. Circuit matching shall be in conformity with a requirement on AC coupling from LVPECL to CML. The switch controller controls the toggle switch to close, thus the pull-down resistor is connected, so as to provide DC bias to LVPECL coupling. In response to the switch controller determining that the operation mode is the 10 G PON mode, the output end of the optical module functions as a CML drive, and the MAC module functions as a CML receiver. Circuit matching shall be in conformity with a requirement on AC coupling from CML to CML. In this case, the switch controller shall control output of the toggle switch to be in a high-resistance state. That is, the toggle switch opens, so as to avoid packet loss due to signal quality being affected by the pull-down resistor.

It shall be noted that the series resistor is used to meet a requirement on tolerable LVPECL input voltage for the CIVIL receiver. Besides, in order to ensure that the series resistor does not significantly affect an amplitude of CML input voltage, so that the CML input voltage can meet the requirement of a normal transmission under the GPON mode, a resistance value of each series resistor is generally no greater than 24.9Ω.

Specifically, the output end of the optical module is a RD output end, the switch controller is a PLD, and the MAC module is a FPP chip.

It shall be noted that operation modes of the port of the optical module according to this embodiment include but not limited to the GPON mode and the 10 G PON mode. The toggle switch and a corresponding pull-down resistor may be provided according to actual requirement to implement a line card for an optical line terminal compatible with a plurality of operation modes.

In the line card for an optical line terminal provided by this embodiment, the optical module is connected to the MAC module to form a first connection line, the series resistor is provided on a side of the first connection line close to the optical module and on the first connection line, the pull-down resistor is connected to the first connection line by means of a second connection line, the toggle switch is provided on the second connection line and is located between the first connection line and the pull-down resistor, and the switch controller is connected to the optical module and the toggle switch, respectively. Herein, the switch controller is used to detect a current operation mode of a port of the optical module, and to control the toggle switch to close or open according to the operation mode, so as to determine the connection or disconnection of the series resistor. In some implementations, different PON technologies can be applied in a compatible manner on a single line card of an OLT, which significantly simplifies hardware development and design, reduces costs on devices, flexibly guarantees practical need of use, and may also effectively reduce costs on system upgrade and operation and maintenance for operators, so that a fluent upgrade can be achieved.

Embodiment 2

Figure 4:
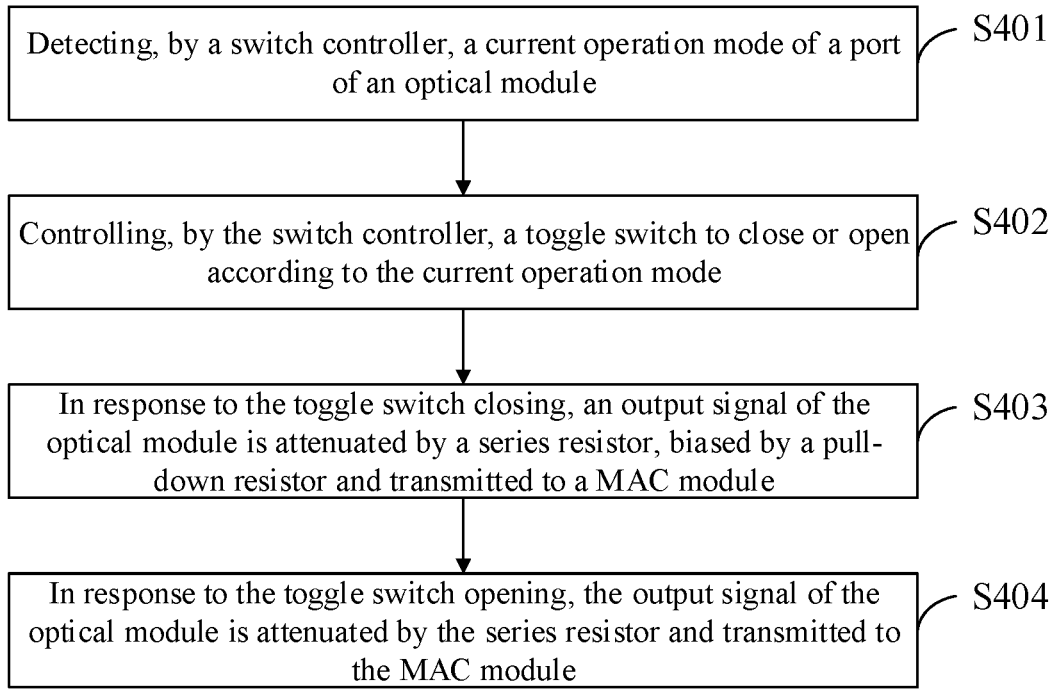
FIG. 4 is a basic flow chart of a method for providing compatible PON function in accordance with Embodiment 2 of the present disclosure.
Figure 5:
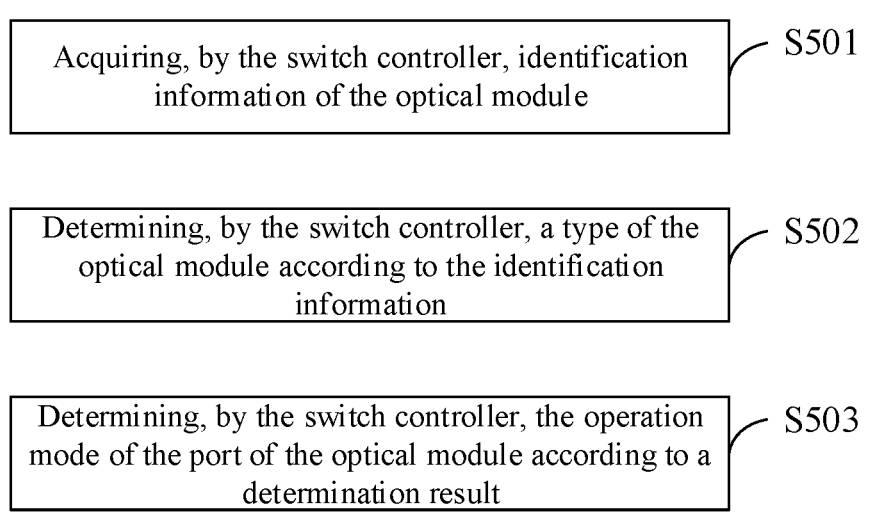
FIG. 5 is a flow chart of the method for providing compatible PON function in accordance with Embodiment 2 of the present disclosure.

This embodiment provides a method for providing compatible PON function on the basis of the line card for the optical line terminal provided in Embodiment 1. See the flow chart as shown in FIG. 4, the method includes the following operations.

In S401, a switch controller detects a current operation mode of a port of an optical module.

In this embodiment, the operation modes of the port of the optical module include a GPON mode and a 10 G PON mode. The states of a toggle switch depend on the operation modes.

The detection of the current operation mode of the port of the optical module by the switch controller includes the following operations.

In S501, the switch controller acquires identification information of the port of the optical module.

In S502, the switch controller determines a type of the optical module according to the identification information.

In S503, the switch controller determines the current operation mode of the port of the optical module according to a determination result.

In S501, the switch controller may be connected to the optical module by an I2C bus. The switch controller may acquire identification information of the port of the optical module through the I2C bus. Specifically, the identification information of the optical module may be a serial ID of the optical module.

In this embodiment, a type of the optical module corresponds to the operation mode. For example, the optical module includes a GPON optical module, a 10 G PON optical module or the like. Therefore, an operation mode of the port of the optical module port can be determined according to the type of the optical module.

In S402, the switch controller controls a toggle switch to close or open according to the operation mode.

In this embodiment, the optical module and the MAC module are connected by the differential lines. Series resistors are provided on the differential lines and on a side of the differential lines close to the optical module, to attenuate signals to meet the requirement for the reception of the MAC module. Specifically, the series resistors are R1 and R2. Coupling capacitors are provided on the differential lines and on a side of the differential lines close to the MAC module, so as to transmit an AC signal from one stage to a next stage, and to cut off a direct current signal when transmitting the AC signal, so that the operation points at adjacent stages are isolated.

The toggle switch is provided between the differential lines and the pull-down resistors and supports a differential input. The toggle switch is controlled by the switch controller. In this embodiment, the switch controller may be a programmable logic device, and the toggle switch is an analog switch. The switch controller is connected with the toggle switch to control the toggle switch to close or open.

In S403, in response to the toggle switch closing, an output signal of the optical module is attenuated by a series resistor, biased by the pull-down resistor and transmitted to the MAC module.

In S404, in response to the toggle switch opening, the output signal of the optical module is attenuated by the series resistor and transmitted to the MAC module.

In this embodiment, operation modes of a port of an optical module include a GPON mode and a 10 G PON mode. In response to the switch controller determining that the operation mode is the GPON mode, an output end of the optical module functions as a LVPECL drive, And the MAC module functions as a CML receiver. Circuit matching shall be in conformity with a requirement on AC coupling from LVPECL to CML. The switch controller controls the toggle switch to close, thus the pull-down resistor is connected, so as to provide DC bias to LVPECL coupling. In response to the switch controller determining that the operation mode is the 10 G PON mode, the output end of the optical module functions as a CML drive, and the MAC module functions as a CML receiver. Circuit matching shall be in conformity with a requirement on AC coupling from CML to CIVIL. In this case, the switch controller shall control output of the toggle switch to be in a high-resistance state. That is, the toggle switch opens, so as to avoid packet loss due to signal quality being affected by the pull-down resistor.

In this embodiment, the series resistor is used to meet a requirement on tolerable LVPECL input voltage for the CML receiver. Besides, in order to ensure that the series resistor does not affect an amplitude of CML input voltage, so that the CIVIL input voltage can meet the requirement of a normal transmission under the GPON mode, a resistance value of each series resistor is generally no greater than 24.9Ω.

It shall be noted that the output end of the optical module is a RD output end, and the MAC module is a FPP chip.

In the method for providing compatible PON function provided by this embodiment, the switch controller detects a current operation mode of a port of an optical module, And the switch controller controls a toggle switch to close or open according to the operation mode. In response to the toggle switch closing, an output signal of the optical module is attenuated by a series resistor, biased by a pull-down resistor and transmitted to the MAC module. In response to the toggle switch opening, the output signal of the optical module is attenuated by the series resistor and transmitted to the MAC module. In some implementations, different PON technologies can be applied in a compatible manner on a single line card of an OLT, which significantly simplifies hardware development and design, reduces costs on devices, flexibly guarantees practical requirement need of use, and may also effectively reduce costs on system upgrade and operation and maintenance for operators, so that a fluent upgrade can be achieved.

The foregoing description, for purpose of explanation, has been described with reference to specific embodiments. However, the illustrative discussions above are not intended to limit the scope of the claims to the precise forms disclosed. Many modifications and variations are possible in view of the above teachings. For those skilled in the art, in a case of not going beyond the concept of the present disclosure, simple modifications and replacements may be made and shall be taken as falling into the protection scope of the present disclosure.

What is claimed is:

1. A line card for an optical line terminal, comprising an optical module, a media access control (MAC) module, a toggle switch, a switch controller, a series resistor and a pull-down resistor,
   wherein the optical module is connected to the MAC module to form a first connection line, the series resistor is provided on a side of the first connection line close to the optical module and on the first connection line, the pull-down resistor is connected to the first connection line by means of a second connection line, the toggle switch is provided on the second connection line and is located between the first connection line and the pull-down resistor, and the switch controller is connected to the optical module and the toggle switch, respectively,
   wherein the series resistor has a resistance value equal to 24.9Ω.

2. The line card for the optical line terminal of claim 1, further comprising a coupling capacitor provided on the first connection line and on a side of the first connection line close to the MAC module.

3. The line card for the optical line terminal of claim 1, wherein the MAC module is a fabric passive optical network (PON) processor (FPP) chip.

4. The line card for the optical line terminal of claim 1, wherein the optical module comprises an optical interface, and the optical interface is a compatible interface.

5. The line card for the optical line terminal of claim 1, wherein the first connection line comprises a first physical line and a second physical line, and the first physical line and the second physical line are differential lines; and
   the series resistor comprises a first series resistor and a second series resistor, the first series resistor is provided on a side of the first physical line close to the optical module and on the first physical line, the second series resistor is provided on a side of the second physical line close to the optical module and on the second physical line.

6. The line card for the optical line terminal of claim 5, wherein the first physical line and the second physical line are parallel to each other, have a same length, and are used for transmitting signals with a phase difference of 180°.

7. The line card for the optical line terminal of claim 1, wherein the switch controller is connected to the optical module through an inter-integrated circuit (I2C) bus, and the I2C bus is used for reading a serial identifier (ID) of the optical module.

8. The line card for the optical line terminal of claim 1, wherein the pull-down resistor is a direct current (DC) bias resistor.

9. The line card for the optical line terminal of claim 1, wherein the switch controller is a programmable logic device, and the toggle switch is an analog switch.

10. A method for providing compatible passive optical network (PON) function, comprising:
    detecting, by a switch controller, a current operation mode of a port of an optical module; and
    controlling, by the switch controller, a toggle switch to close or open according to the current operation mode;
    wherein in response to the toggle switch closing, an output signal of the optical module is attenuated by a series resistor, biased by a pull-down resistor and transmitted to a media access control (MAC) module; or in response to the toggle switch opening, the output signal of the optical module is attenuated by the series resistor and transmitted to the MAC module,
    wherein the series resistor has a resistance value less than or equal to 24.9Ω.

11. The method for providing compatible PON function of claim 10, wherein the detecting, by the switch controller, the current operation mode of the port of the optical module comprises:
    acquiring, by the switch controller, identification information of the port of the optical module;
    determining, by the switch controller, a type of the optical module according to the identification information; and
    determining, by the switch controller, the current operation mode of the port of the optical module according to the type of the optical module.

12. The method for providing compatible PON function of claim 10, wherein the operation mode comprises a gigabit-capable passive optical network (GPON) mode and a 10 G PON mode; and
    controlling, by the switch controller, the toggle switch to close or open according to the current operation mode comprises:
    in response to the current operation mode being the GPON mode, controlling the toggle switch to close; or
    in response to the current operation mode being the 10 G PON mode, controlling the toggle switch to open.

* * * * *

UNITED STATES PATENT AND TRADEMARK OFFICE
CERTIFICATE OF CORRECTION

PATENT NO. : 12,081,925 B2
APPLICATION NO. : 17/776596
DATED : September 3, 2024
INVENTOR(S) : Shengjie Liu and Feng Xue It is certified that error appears in the above-identified patent and that said Letters Patent is hereby corrected as shown below:

In the Claims

Column 10, Line 25-26; "wherein the series resistor has a resistance value less than or equal to", should be "wherein the series resistor has a resistance value equal to"

Signed and Sealed this
Twenty-ninth Day of October, 2024

Katherine Kelly Vidal
Katherine Kelly Vidal
*Director of the United States Patent and Trademark Office*